United States Patent [19]

Takeuchi

[11] Patent Number: 4,928,117

[45] Date of Patent: May 22, 1990

[54] THERMAL PRINTOUT DENSITY CONTROL

[75] Inventor: Toshiyuki Takeuchi, Chigasaki, Japan

[73] Assignee: Graphtec Kabushiki Kaisha, Tokyo, Japan

[21] Appl. No.: 257,983

[22] Filed: Oct. 14, 1988

[30] Foreign Application Priority Data

Oct. 17, 1987 [JP] Japan .................. 62-262345

[51] Int. Cl.$^5$ ............................................ G01D 15/10
[52] U.S. Cl. .................... 346/76 PH; 400/120
[58] Field of Search .................. 346/1.1, 76 PH; 400/120 PH

[56] References Cited

U.S. PATENT DOCUMENTS

| | | | |
|---|---|---|---|
| 3,689,937 | 9/1972 | Phillips et al. | 346/139 C |
| 3,774,226 | 11/1973 | Ballinger et al. | 346/35 |
| 3,792,481 | 2/1974 | Nagashima et al. | 346/76 R |
| 3,815,144 | 6/1974 | Aiken | 346/76 R |
| 3,840,878 | 10/1974 | Houston et al. | 346/76 R |
| 3,877,035 | 4/1975 | Miller et al. | 346/139 R |
| 3,971,041 | 7/1976 | Mason | 346/76 R |
| 3,980,169 | 9/1976 | Decker et al. | 197/55 |
| 4,038,664 | 7/1977 | Muir | 346/136 |
| 4,074,273 | 2/1978 | Dupree et al. | 346/34 |
| 4,085,407 | 4/1978 | Stratbucker et al. | 346/33 ME |
| 4,096,484 | 6/1978 | Ferre et al. | 346/33 EC |
| 4,119,974 | 10/1978 | Ondis et al. | 346/145 |
| 4,134,062 | 1/1979 | Pizzuti et al. | 346/32 |
| 4,145,698 | 3/1979 | Wysong | 346/139 R |
| 4,151,397 | 4/1979 | Boor, Jr. et al. | 346/76 R |
| 4,168,505 | 9/1979 | Gaskill, Jr. et al. | 346/139 R |
| 4,205,395 | 5/1980 | Shortridge | 346/76 PH |
| 4,211,992 | 7/1980 | Gaskill, Jr. | 335/222 |
| 4,262,336 | 4/1981 | Pritchard | 364/474 |
| 4,284,876 | 8/1981 | Ishibashi et al. | 346/76 PH |
| 4,332,193 | 6/1982 | Noyes | 101/93.01 |
| 4,369,452 | 1/1983 | Anno et al. | 346/76 PH |
| 4,393,386 | 7/1983 | Di Giulio | 346/75 |
| 4,425,571 | 1/1984 | Mueller et al. | 346/136 |
| 4,426,651 | 1/1984 | Mueller et al. | 346/136 |
| 4,442,442 | 4/1984 | O'Dell | 346/136 |
| 4,447,819 | 5/1984 | Moriguchi et al. | 346/76 PH |

(List continued on next page.)

FOREIGN PATENT DOCUMENTS 54-159928 11/1979 Japan .
55-97976 7/1980 Japan .
55-156080 12/1980 Japan .
58-31022 2/1983 Japan .
60-29990 7/1983 Japan .

OTHER PUBLICATIONS

Thermal Printer with In–Memory Scan–Line Composition, IBM Technical Disclosure Bulletin, vol. 22, No. 5, Oct. 1979, p. 2022.

Collier's Encyclopedia, The Crowell–Collier Publishing Company, 1962, vol. 8, pp. 226 and 232.

Primary Examiner—Bruce A. Reynolds
Assistant Examiner—Huan Tran
Attorney, Agent, or Firm—Benoit Law Corporation

[57] ABSTRACT

Data records provided by thermal recording heads, including a plurality of clocked heating elements, are controlled in density by continually storing for each of such heating elements a present moment recording datum and further recording data including a one-clock-interval-old recording datum and a two-clock-interval-old recording datum for the particular heating element, and by continually generating for each heating element from the present moment recording datum to be recorded a first dot recording energization quantum and for each of the further dot recording data having been printed a dot recording energization pause and for each blank value of such further dot recording data a further dot recording energization quantum. This advantageously includes an insertion, for each one-clock-interval-old recording datum having been printed by the particular heating element, of an energization pause between a dot recording energization quantum corresponding to a blank value of the immediately preceding two-clock-interval-old recording datum and the then present moment dot recording energization datum. The heating elements are sequentially energized with dot recording quanta thus generated.

5 Claims, 8 Drawing Sheets

U.S. PATENT DOCUMENTS

| | | | |
|---|---|---|---|
| 4,455,578 | 6/1984 | Fearnside | 358/302 |
| 4,456,951 | 6/1984 | Henneberger et al. | 364/131 |
| 4,462,704 | 7/1984 | Kurata et al. | 346/76 PH |
| 4,504,906 | 3/1985 | Itaya et al. | 364/200 |
| 4,536,778 | 8/1985 | De Schamphelaere et al. | 346/160 |
| 4,563,691 | 1/1986 | Noguchi et al. | 346/76 PH |
| 4,574,293 | 3/1986 | Inui et al. | 346/76 PH |
| 4,590,488 | 5/1986 | Sullivan | 346/76 PH |
| 4,595,303 | 6/1986 | Kuzuya et al. | 400/82 |
| 4,595,935 | 6/1986 | Brooks et al. | 346/76 PH |
| 4,607,262 | 8/1986 | Moriguchi et al. | 346/76 PH |
| 4,660,052 | 4/1987 | Kaiya et al. | 346/76 PH |
| 4,723,132 | 2/1988 | Matsuo | 346/76 PH |
| 4,739,344 | 4/1988 | Sullivan et al. | 346/76 PH |

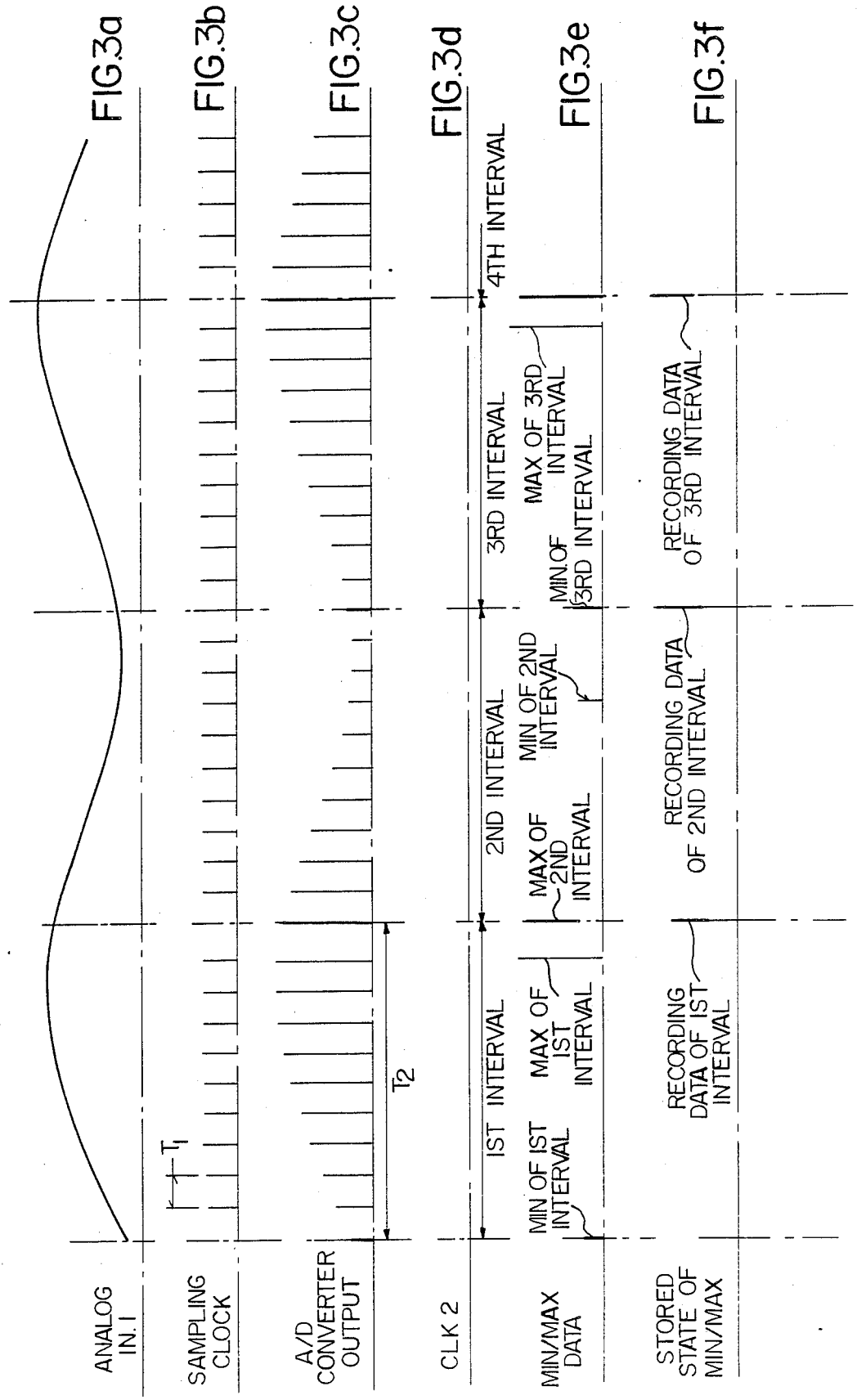

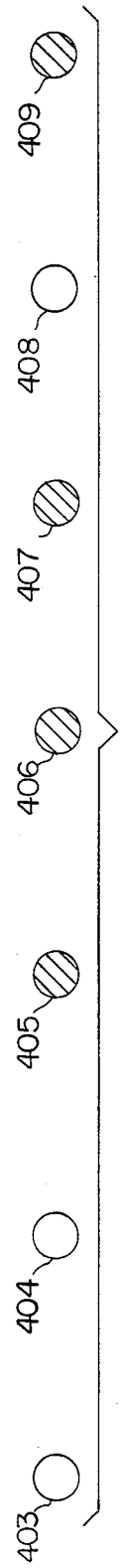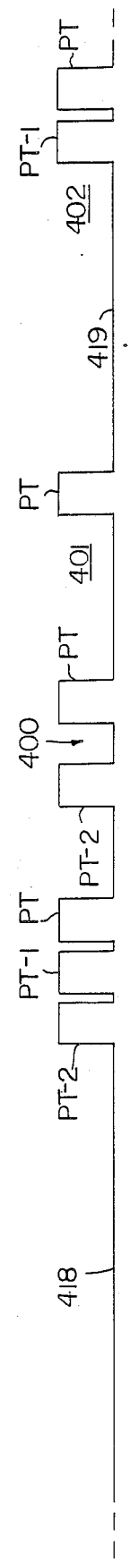

THERMAL PRINTOUT DENSITY CONTROL

BACKGROUND OF THE INVENTION

1. Field of the Invention

The subject invention relates to thermal recording with thermal recording heads including a plurality of clocked heating elements and, more specifically, to a density control for records so produced.

2. Information Disclosure Statement

The following disclosure statement is made pursuant to the duty of disclosure imposed by law and formulated in 37 CFR 1.56(a). No representation is hereby made that information thus disclosed in fact constitutes prior art, inasmuch as 37 CFR 1.56(a) relies on a materiality concept which depends on uncertain and inevitably subjective elements of substantial likelihood and reasonableness and inasmuch as a growing attitude appears to require citation of material which might lead to a discovery of pertinent material though not necssarily being of itself pertinent. Also, the following comments contain conclusions and observations which have only been drawn or become apparent after conception of the subject invention or which contrast the subject invention or its merits against the background of developments which may be subsequent in time or priority.

Also, no preamble of any statement of invention or claim hereof is intended to represent that the content of that preamble is prior art, particularly where one or more recitations in a preamble serve the purpose of providing antecedents for the remainder of a statement of invention or claim.

Efforts to provide operable and efficient recorders with thermal printheads have been of long standing and were to no small part prompted by inadequacies of moving coil galvanometer-type recording apparatus, which have inherent limitations despite various improvements, including those disclosed in U.S. Pat. No. 4,134,062, by Pizzuti et al, issued Jan. 9, 1979 to Atlan-Tol Industries, Inc., for a limited rotation instrument rebalance apparatus employing a wiper having vibration damping, and U.S. Pat. No. 4,211,92, by D. M. Gaskill, Jr., issued July 8, 1980 to Atlan-Tol Industries, Inc., for positioning means for a limited rotation motor.

For an example of a moving coil thermal recorder, reference may be had to U.S. Pat. No. 3,689,937, by Phillips et al, issued Sept. 5, 1972 to Evershed & Vignoles Limited, for thermal recording styli and control circuits therefor.

The development of thermal recorders also has benefited from the development of transverse recorders as disclosed, for instance, in U.S. Pat. No. 3,774,226, by Ballinger et al, issued Nov. 20, 1973 to Honeywell Inc., and disclosing a plurality of recording elements arranged across the recording medium to define a transverse recording line.

Thermal recording media also developed into different forms as may, for instance, be seen from U.S. Pat. No. 3,792,481, by Nagashima et al, issued Feb. 12, 1974 to Canon K.K., for recording by heat sensitive multicolor indication, disclosing suitable heat sensitive materials.

An array of heat producing elements is disclosed in U.S. Pat. No. 3,815,144, by H. H. Aiken, issued June 4, 1974, for Thermal Recorder Having an Analogue to Digital Converter. In this respect, an analog-to-digital converter for a magnetic transverse recorder was disclosed in the above mentioned Ballinger et al U.S. Pat. No. 3,774,226.

A computer controlled chart advance is disclosed in U.S. Pat. No. 3,840,878, by Houston et al, issued Oct. 8, 1974 to Texas Instruments Incorporated, for a dual mode thermal recorder. An event marker for graphic recorders has been disclosed in U.S. Pat. No. 3,877,035, by Miller et al, issued Apr. 8, 1975 to Leeds & Northrup Company, and showing also a print element suspension. Another print element suspension is shown in U.S. Pat. No. 3,980,169, by Decker et al, issued Sept. 14, 1976 to Triumph Werke Nurnberg A.G., for an impact control for a single element printer.

A chart recorder using a fixed thermal printhead is disclosed in U.S. Pat. No. 3,971,041, by C. F. Mason, issued July 20, 1976 to Esterline Corporation, and disclosing a marginal array of heat generating dots in addition to a single row of heat generating dots along the printhead. A recording control or chart lock is disclosed in U.S. Pat. No. 4,038,664, by A. R. Muir, issued July 26, 1977 to The Perkin-Elmer Corporation. A sequential value multi-point recording device with unidirectional scan is disclosed in U.S. Pat. No. 4,074,273, by Dupree et al, issued Feb. 14, 1978 to The Dow Chemical Company.

Even after the development of thermal printheads, resort still was had to the use of mechanical recording stylii as may, for instance, be seen from U.S. Pat. No. 4,085,407, by Stratbucker et al, issued Apr. 18, 1978 to Health Technology Laboratories, Inc., and U.S. Pat. No. 4,096,484, by Ferre et al, issued June 20, 1978 to Edo Western Corporation, for a graphic recording system including a plurality of memories for storing information received over different channels for recording with different recording devices.

The recording apparatus disclosed in U.S. Pat. No. 4,119,974, by Ondis et al, issued Oct. 10, 1978 to Atlan-Tol Industries, Inc., employed both a thermal recording head and a thermal recording stylus.

A real breakthrough is apparent from U.S. Pat. No. 4,145,698, by R. D. Wysong, issued Mar. 20, 1979 to Shakespeare Marine Electronics, Inc., and subsequently assigned to Holly Springs of Florida Incorporated, and by them to the common assignee of the entire interest hereof. In particular, that Wysong patent shows a thermal printhead biasing arrangement using, in its own words, a helical compression spring for biasing at least one thermal printhead into tangential contact with the thermal printing paper. That Wysong patent also discloses an arrangement of two thermal printheads in substantially aligned, substantially abutting end-to-end relation with each other so that the longitudinal dimensions of these printheads are in substantially transverse relation to the chart at the printing station and so that the printheads engage that chart on the opposite side thereof from the chart advancing means. That Wysong patent also discloses mounting means independently mounting the first and second printheads so that they are independently movable toward the chart. The helical compression springs are also arranged in this Wysong patent for independently biasing the first and second printheads towards the chart. Independent biasing of several thermal printheads with helical compression springs has also been disclosed in U.S. Pat. No. 4,151,397, by Boor, Jr. et al, issued Apr. 24, 1979 to E-Systems, Inc.

A thermal recording stylus usable in the above mentioned Ondis et al U.S. Pat. No. 4,119,974 was subsequently disclosed in U.S. Pat. No. 4,168,505, by Gaskill, Jr. et al, issued Sept. 18, 1979 to Atlan-Tol Industries, Inc.

Microprocessor-controlled multiple-head thermal recorders have been disclosed by Markson et al, in an illustrated article entitled Thermal Printer with In-Memory Scan-Line Composition in the IBM Technical Disclosure Bulletin, Vol. 22, No. 5 (October 1979), p. 2022, and in U.S. Pat. No. 4,205,395, by E. J. Shortridge, issued May 27, 1980 to Shakespeare Marine Electronics, Inc.

U.S. Pat. No. 4,262,336, by E. K. Pritchard, issued Apr. 14, 1981 for a Multi-Axis Contouring Control System in which a host computer and multi-processor system is shared with a master controller, and a slave controller controlled by part of the master controller.

A thermal line printer with a plurality of printheads has also been disclosed in U.S. Pat. No. 4,332,193, by B. P. Noyes, issued June 1, 1982. A thermal recording head and a drive therefor have been disclosed in U.S. Pat. No. 4,369,452, by Anno et al, issued Jan. 18, 1983 to Tokyo Shibaura Denki K.K.

U.S. Pat. No. 4,393,386, by P. C. Di Giulio, issued July 12, 1983 to Pitney Bowes, Inc., for Ink Jet Printing Apparatus also discloses application of the above mentioned host computer, multi-processor, master and slave controller system to printing apparatus.

U.S. Pat. No. 4,425,571, by Mueller et al, issued Jan. 10, 1984 and U.S. Pat. No. 4,426,651, by Muellner et al, issued Jan. 17, 1984, both to The Perkin-Elmer Corporation, also show control of the chart advance from a microprocessor. A data synchronization system for graphic recording apparatus has been disclosed in U.S. Pat. No. 4,442,442, by G. B. O'Dell, issued Apr. 10, 1984 to Tektronix, Inc.

U.S. Pat. No. 4,447,819, by Moriguchi et al, issued May 8, 1984 to Fuji Xerox Co., Ltd., discloses thermal recording apparatus including a control for determining a number of blocks to be simultaneously driven to perform recording without exceeding the capacity of the power source.

U.S Pat. No. 4,455,578, by W. T. Fearnside, issued June 19, 1984 to Eastman Kodak Company, for Electronics for Arrayed Photosources discloses controlled circuitry in which each sub-array of LED recording devices was controlled by its own control assembly governed by a sequence controller with the aid of clock generator circuits. That patent also discloses replacement of a prior-art print enable signal by binary weighted pulses derived from clock generator circuits, which also supply a shift frequency pulse train instead of the prior-art weighted frequency clock. This could easily be implemented as a master/slave control arrangement of the type employed for millions of years. In particular, it became known some time ago that the so-called "second brain" of the kind of dinosaur called "Stegosaurus" actually was an enlargement of the spinal chord in the hip region which, in turn, was controlled from the actual brain in the head through the spinal chord. In other words, the enlargement of the spinal chord in the hip region actually was a slave of the master controller in the head brain that also included the host computer which processed the sensory signals received from the eyes, ears and other sensors and which applied corresponding signals to the "master controller" for energizing the fore part of the animal and for actuating the "slave controller" in the hip region to energize the hind portion of the animal. Reference may in this respect be had to COLLIER'S ENCYCLOPEDIA (The Crowell-Collier Publishing Company, 1962), Vol. 8, pp. 226 and 232.

Numerical machine tool controls also employ several processors and monitoring circuits as may, for instance, be seen from U.S. Pat. 4,456,951, by Henneberger et al, issued June 26, 1984 to Siemens Aktiengesellschaft.

U.S. Pat. No. 4,462,704, by Kurata et al, issued July 31, 1984 to Fuji Xerox Co., Ltd., discloses a thermal head driving system with selective energization of printheads in parallel relation, including prior-art systems (FIGS. 1-3) and a pulse generator for producing drive pulses having a width determined in accordance with a ratio of a resistance value of each thermal head (FIGS. 4 and 5).

U.S. Pat. No. 4,504,906, by Itaya et al, issued Mar. 12, 1985 to Anritsu Electric Company Limited, discloses a multiprocessor system comprising a plurality of central processing units periodically and cyclically enabled to access a bus for data transfer from one unit to another.

U.S. Pat. No. 4,536,778, by De Schamphelaere et al, issued Aug. 20, 1985 to AGFA-Gevaert N.V., discloses recording apparatus with modular LED arrays of higher production yield.

Appropriate control of the heat of thermal heads can be an important factor, as may be seen from U.S. Pat. No. 4,574,293, by Inui et al, issued Mar. 4, 1986 to Fuji Xerox Co., Ltd., for a compensation for heat accumulation in a thermal head. Electric energy to be applied to each heating element of the thermal head is controlled by taking into account the energy applied to the heating element up to two scan periods before, as well as the effect of heat accumulated in heating elements surrounding the heating element, and then the energy thus controlled is recorrected taking into consideration the temperature change in a thermal head base plate or the change in printing time between lines.

U.S. Pat. No. 4,590,488, by M. J. Sullivan, issued May 20, 1986 to Astro-Med, Inc., discloses a circuit for controlling energization of a thermal print head, by varying the pulse width of head energization depending on the head temperature which is fed back to the circuitry.

An example of different controls for printing apparatus may also be seen from U.S. Pat. No. 4,595,303, by Kuzuya et al, issued June 17, 1986 to Brother Kogyo K.K., for printing apparatus with two print heads. A system for detecting defective thermal printhead elements has been disclosed in U.S. Pat. No. 4,595,935, by Brooks et al, issued June 17, 1986 to NCR Canada Ltd.

U.S. Pat. No. 4,607,262, by Moriguchi et al, issued Aug. 19, 1986 to Fuji Xerox Co., Ltd. <discloses a thermal head drive circuit and describes a transfer-type heat sensitive recording medium responsive to selective energization of the thermal printhead for selectively producing markings on a chart or an ordinary sheet of paper. That patent also discloses prior-art thermal head drive circuits (FIGS. 1-3) and head drive circuits with a heat accumulation calculating unit for calculating the heat residual from prior recording steps and from data recorded on neighboring recording elements (FIGS. 4-11).

U.S Pat. No. 4,613,872, by Naito et al, issued Sept. 23, 1986, discloses a recorder which records analog input waveforms and converts analog input data into digital data at regular intervals and at selected times records the digital data in the form of a list of data alongside of the analog input waveforms together with the time and other information. When analog waveforms and characters are recorded in side-by-side relation, the speed at which the paper is fed is changed from that employed when only analog waveforms are recorded, whereby the list of data can be quickly recorded.

U.S. Pat. No. 4,660,052, by Kaiya et al, issued Apr. 21, 1987, for heat sensitive recording apparatus discloses a plurality of elongate thermal printheads mounted so that the longitudinal dimension thereof are in substantially transverse relation to the recording chart at the printing station and at fixed positions in the transverse extent of the chart. As disclosed in that patent, the printheads are disposed adjacent different longitudinally extending sections of the chart and cooperate to define a substantially continuous printing width which extends substantially across the width of the chart at the printing station.

U.S Pat. No. 4,748,454, by Ikeda et al, issued May 31, 1988 to Nihon Kohden Corporation, discloses a dot array recorder having an LED level meter arranged to correspond position array to a dot array head, to indicate printed dot position.

U.S. Pat. No. 4,748,455, by Masaaki Mori, issued May 31, 1988 to Ricoh Company, Ltd., discloses systems for driving a thermal print head including a plurality of heat-producing elements which are activated selectively in accordance with digital image data obtained from an analog image signal is provided. In one aspect, the driving system is so structured to insert additional data between any two adjacent image data whenever the space between the two exceeds a predetermined level thereby allowing to maintain the dot density at constant when printed. In another aspect, that driving system controls the time period of activation of each of the heat-producing elements in accordance with preheat control data obtained by carrying out inverting and AND processing between each of the digital image data of one print line and the corresponding each of the digital image data of the next following print line (FIGS. 11 to 13). In a further aspect, that driving system has a structure such that a reference point in a print line may be set at a desired location along the print line.

Japanese Utility Model Publication 54-159928, by Motoo Kuroiwa et al, Hokuso Kaihatsu Tetsudo K.K., published Nov. 8, 1979, discloses a thermal dot printer in which heads are alternatively energized.

Japanese Patent Publication 55-97976, by Wakabayashi et al, Japanese National Railways and Nihon Singo K.K., published July 25, 1980 discloses a thermal printer wherein several printheads are mounted side by side and are independently biased from each other. In one embodiment, the thermal printheads are mounted on a crankshaft having a crank so that the thermal heads are collectively moved up and down when the crankshaft is driven by an electric motor. Another embodiment provides a slight play or gap in a junction between each of the thermal heads and the crankshaft, and pressure is exerted on the thermal head by use of compression springs. However, freedom of each thermal head at its supporting portion is excessively limited, since there is only a slight play or gap in the junction between each thermal head and the crankshaft.

Japanese Patent Publication 55-156080, by Shinshu Seiki Co., Ltd. et al, published Dec. 4, 1980, discloses a different approach in which one or two thermal heads are reciprocated transversely of the recording paper. That Patent Publication also shows circuitry for effecting and controlling the energization of the two thermal printheads.

Japanese Patent Publication 58-31022, by T. Dobashi, Nippon Denshin Denwa Kosha, published Feb. 24, 1983, discloses a processor controlling system having a common memory of a main control processor and a processor to be controlled, and a control circuit for sending out control signals to the processor to be controlled, in accordance with a control order from the main control processor.

Japanese Pat. No. 60-29990, issued from Japanese Patent Publication 58-112170, by H. Takatsudo, Casio Keisanki K.K., published July 4, 1983, discloses an electronic register with automatic load control circuitry.

For a summary of the prior art, reference may be had to the recently issued U.S. Pat. No. 4,739,344, by Sullivan et al, issued Apr. 19, 1988 to Astro-Med, Inc., for a chart recorder having multiple thermal printheads mounted so that the longitudinal dimensions thereof are in substantially transverse relation to the chart at the printing station and at fixed positions in the transverse extent of the chart. That Sullivan et al patent also claims, but does not otherwise disclose, the printheads being disposed adjacent different longitudinally extending sections of the chart and cooperating to define a substantially continuous printing width which extends substantially across the width of the chart at the printing station, as disclosed in the above mentioned Kaiya et al U.S. Pat. No. 4,660,052.

That Sullivan et al patent, also shows and describes the mounting of elongate printheads in substantially aligned, substantially abutting end-to-end relation with each other so that the longitudinal dimensions of the elongate printheads are in substantially transverse relation to the chart, as disclosed, for instance, in the above mentioned Wysong U.S. Pat. No. 4,145,698 and in the above mentioned IBM Technical Disclosure Bulletin Publication by Markson et al. That Sullivan et al patent also describes and shows the kind of independent biasing of each recording head disclosed in the above mentioned Wysong U.S. Pat. No. 4,145,698, Boor et al U.S. Pat. No. 4,151,397, and Wakabayashi et al Japanese Patent Publication 55-97976. That Sullivan et al patent also describes and shows microprocessor control systems including a master/slave control of the above mentioned kind applied to energization of two thermal printheads.

That Sullivan et al U.S. Pat. No. 4,739,344 also describes master and slave history circuits shown at 40 and 60 in FIGS. 2 and 2a and disclosed by reference to the above mentioned Inui et al U.S. Pat. No. 4,574,293, Moriguchi et al U.S. Pat. No. 4,607,262, and Sullivan U.S. Pat. No. 4,590,488.

SUMMARY OF THE INVENTION

It is a general object of this invention to provide improved density control for thermal printing processes.

It is a germane object of this invention to provide increased printing densities.

It is a related object of this invention to provide for increased printing speeds without loss of printout density.

It is also an object of this invention to simplify print density control circuitry to relatively simple elements.

Other objects of the invention will become apparent in the further course of this disclosure.

From a first aspect thereof, the subject invention resides in methods and apparatus for providing a data record with a thermal recording head including a plurality of clocked heating elements, and, more specifically, resides in the improvement comprising in combination the steps of, or means for, controlling such records in density by continually storing for each of the heating elements a present moment recording datum and further recording data including a one-clock-interval-old recording datum and a two-clock-interval-old recording datum for the particular heating element, continually generating for each heating element from the present moment recording datum to be recorded a first dot recording energization quantum and for each of the mentioned further dot recording data having been printed a dot recording energization pause and for each blank value of such further dot recording data a further dot recording energization quantum, and sequentially energizing the heating elements with dot recording quanta thus generated. Means for generating for each heating element the above mentioned dot recording energization quanta and dot recording energization pause include AND elements corresponding in number for each heating element to the number of the memory areas for each heating element minus one, and having outputs connected to means for sequentially energizing the heating elements with dot recording quanta, an inverter for each AND element having an output connected to an input of that AND element, and a processor for selectively connecting one of the memory areas to the energizing means and inputs of the inverters to other of the memory areas. This processor may sequentially connect the memory areas for the heating element to the energizing means and the remaining memory areas for that heating element sequentially to inputs of the inverters.

A preferred embodiment of the invention includes inserting for each one-clock-interval-old recording datum having been printed by the particular heating element an energization pause between a dot recording energization quantum corresponding to a blank value of the immediately preceding two-clock-interval-old recording datum and the above mentioned first dot recording energization quantum representing the then present moment recording datum. From a related aspect thereof, the invention resides in apparatus for recording data with a thermal recording head including a plurality of clocked heating elements, and more specifically, in the improvement comprising, in combination, memory areas for distinctly storing recording data, including three memory areas for each heating element, means for sequentially applying to each of these three memory areas a present moment recording datum, a one-clock-interval-old recording datum, and a two-clock-interval-old recording datum, respectively, for the particular heating element, a first inverter having an input connected to the memory area storing the one-clock-interval-old recording datum, a second inverter having an input connected to the memory area storing said two-clock-interval-old recording datum, a first AND element having a first input connected to the memory area storing the present moment recording datum and its second input connected to an output of the first inverter, a second AND element having a first input also connected to the memory area storing the present moment recording datum and its second input connected to an output of the second inverter, and means connected to the memory area storing the present moment recording datum and to outputs of the first and second AND elements for sequentially energizing the particular heating element pursuant to the present moment recording datum, and with an output of the first AND element and an output of the second AND element.

As herein disclosed, this concept may be expanded, such as by providing more than three memory areas for storing further past recording data for each heating element, and by using AND elements and inverters corresponding in number to such more than three memory areas minus one.

DESCRIPTION OF THE DRAWINGS

The subject invention and its various aspects and objects will become more readily apparent from the following detailed description of preferred embodiments thereof, illustrated by way of example in the accompanying drawings, in which like reference numerals designate like or equivalent parts, and in which:

FIG. 2 is an explanatory diagram showing in greater detail an important portion of the thermal chart recorder of FIG. 1, in which

FIGS. 3a to 3f are a timing diagram showing the data take-in and read-out operation of the present invention;

FIGS. 5a to 5d are a timing diagram for a specific heating element going through various energization phases pursuant to the illustrated preferred embodiment of the invention.

DESCRIPTION OF PREFERRED EMBODIMENTS

Figure 1:
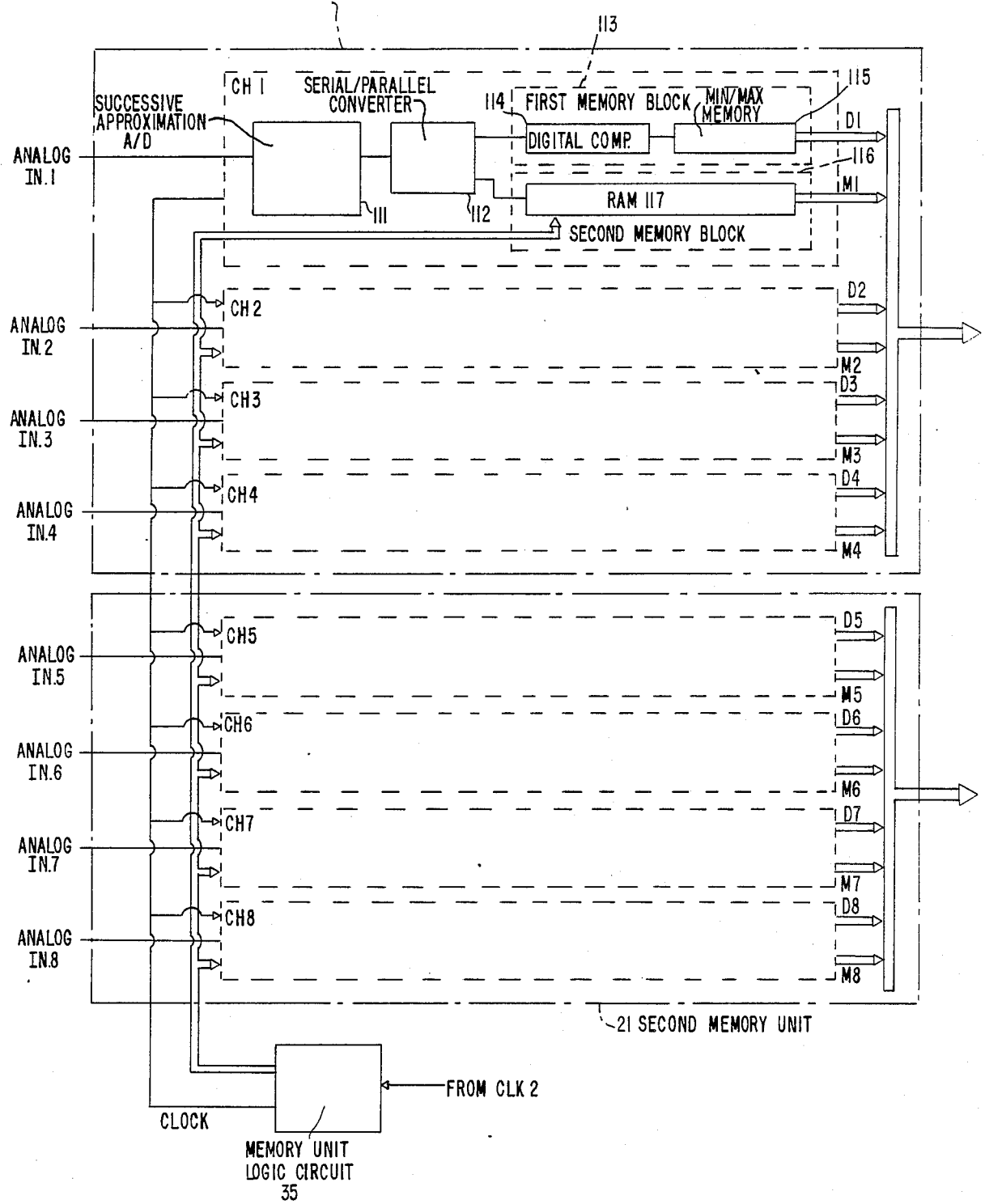
FIGS. 1-1 and 1-2 are a block diagram showing the general configuration of a thermal chart recorder embodying the present invention.
Figures 1, 2:
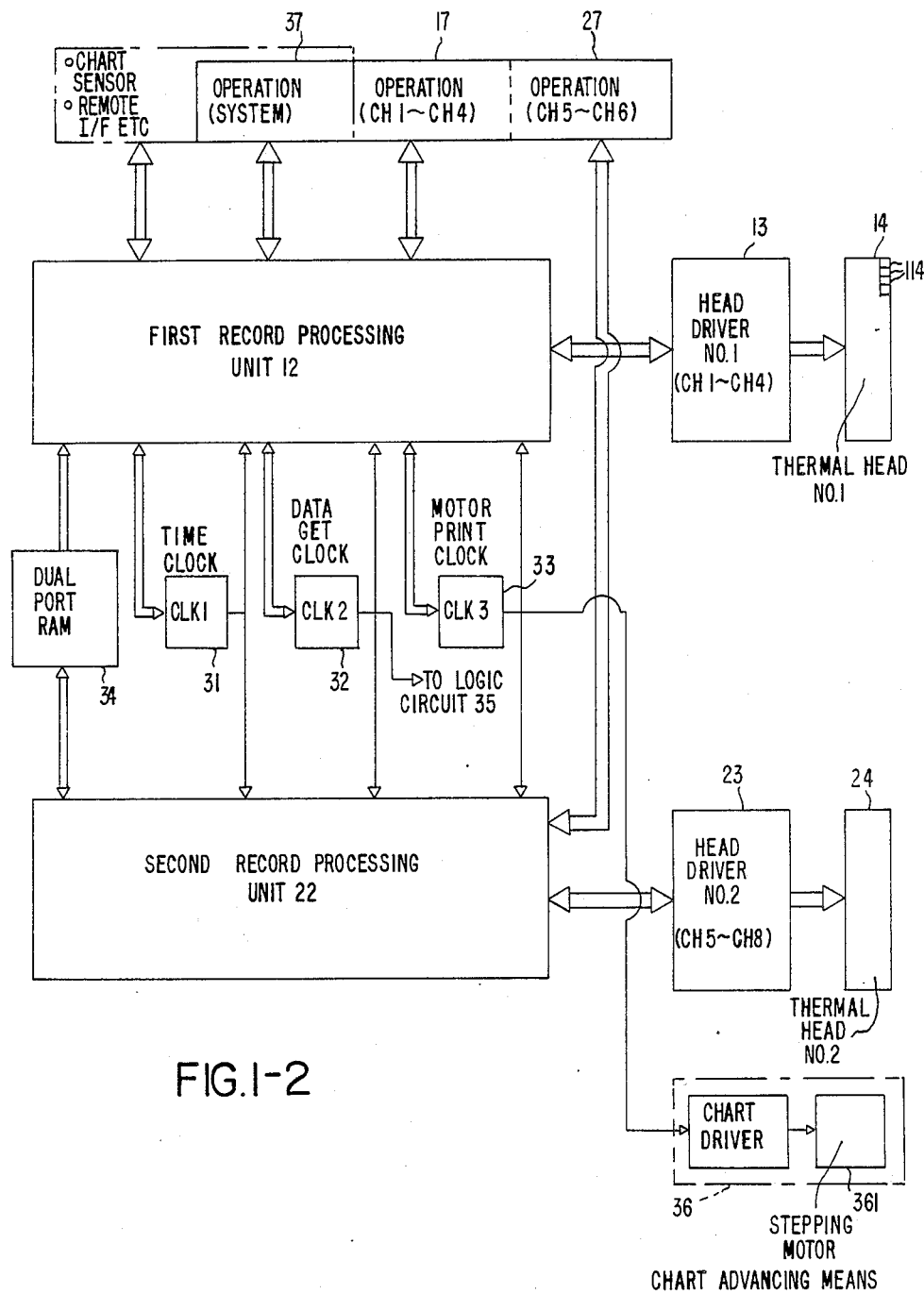

FIG. 1 is a block diagram showing a preferred embodiment of a thermal chart recorder according to the present invention, which is designated by reference numeral 1.

The thermal chart recorder 1 has a first recorder block, a second recorder block, and a matching block for matching these two recorder blocks with each other.

The first recorder block has a first memory unit 11, a first record processing unit 12, a first thermal head driver 13, a first thermal head 14, and a first recorder block operation unit or keyboard 17.

The second recorder block has a second memory unit 21, a second record processing unit 22, a second thermal head driver 23, a second thermal head 24, and a second recorder block operation unit or keyboard 27.

The matching block has a first clock generator 31, a second clock generator 32, a third clock generator 33, a dual port RAM 34, a memory unit logic circuit 35, a chart advancing circuit or means 36, and a system operation unit or keyboard 37.

The first memory unit 11 of the first recorder block is identical in structure with the second memory unit 21 of the second recorder block. The first memory unit 11 has four channel blocks CH.1–CH.4 for storing corresponding signals of channels 1 through 4 to be recorded. Similarly, the second memory unit 21 has four channel blocks CH.5–CH.8. These channel blocks are identical in structure, hence, the configuration of the channel block CH.1 only will now be described.

The channel block CH.1 has a successive approximation A/D converter 111, a serial/parallel converter 112, a first memory block 113, and a second memory block 116. The first memory block 113 has a digital comparator 114 and a min./max. memory 115, which temporarily stores the maximum and minimum values, appearing in a given interval, of a signal, Analog. In.1, to be recorded This first memory block 113 is used in a direct mode hereinafter described.

On the other hand, the second memory block 116 is made of a RAM 117 and adapted to a successively store digital values obtained by converting the signal, Analog In.1, to be recorded. This second memory block 116 is used in a memory mode hereinafter described.

Either or both of the direct mode and the memory mode can be selected simultaneously by the system operation keyboard 37 of the matching block.

The record processing units of the embodiment will now be described. Since the first record processing unit 12 of the first recorder block and the second record processing unit 22 of the second recorder block are identical in structure, only the first record processing unit 12 and its relationship with other components will now be described with reference to FIG. 2A mainly showing this unit 12.

The first record processing unit 12 has a first processor 121, a first ROM 122, a first RAM 123, a first section pattern ROM 124 (coordinate graduation or grid pattern), and a first character generator 125. Stored in the first ROM 122 are a system program which determines the general operation of a unit capable of read-out under control of the first processor 121 and a first recorder block control program which controls recording of the signals to be recorded of the first recorder block, i.e. the signals of CH.1–CH.4.

The first RAM 123 temporarily holds data during the record processing of the first recorder block under control of the first processor 121. The first section pattern ROM 124 has several section patterns stored therein which are used to picture a section (coordinate graduation or grid pattern) line group in the form of a lattice on a chart. The section pattern is selected by means of the system operation keyboard 37 of the matching block or the first recorder block operation keyboard 17, and its read-out operation is started by the first processor 121. The first character generator 125 is used to record characters or symbols, and these characters or symbols are selected by means of the system operation keyboard 37 of the matching block or the first recorder block operation keyboard 17 and selectively read out by the first processor 121. The data thus processed by the foregoing components are sent under control of the first processor 121 to the first thermal head driver 13 and to a first level meter driver 15 (which is omitted from FIG. 1 to avoid crowding) so that the analog input signal given is recorded by the first thermal head 14 and indicated by a first level meter 16. The first recorder block operation keyboard 17 of the first record processing unit 12 is used also to set various conditions which are used to subject the signals to be recorded of CH.1–CH.4 to a given record processing.

The second record processing unit 22 of the second recorder block is substantially identical in structure with the first record processing unit 12, but this second record processing unit 22 is used to process the signals to be recorded of CH.5–CH.8, not of CH.1–CH.4; therefore, an operation keyboard 27 for CH.5–CH.8 is connected instead of the operation keyboard 17 for CH.1–CH.4.

The first processor 121 of the first record processing unit 12 functions as the matching block for matching the first record processing unit 12 and the second record processing unit 22 with each other, that is, it controls the memory unit logic circuit 35 and the chart advancing means 36. The memory unit logic circuit 35 controls the operation of the first memory unit 11 and of the second memory unit 21. The chart advancing means 36 causes its stepping motor 361 to feed the chart at given speed.

As the matching block for matching the first record processing unit 12 and the second record processing unit 22 with each other, the first clock generator 31, second clock generator 32, third clock generator 33, and dual port RAM 34 are coupled between the first processor 121 of the first record processing unit 12 and a second processor 221 of the second record processing unit 22.

To set various conditions in the thus configured matching block for the first record processing unit 12 and the second record processing unit 22, the system operation keyboard 37 is coupled to the first record processing unit 12.

Figure 2A:
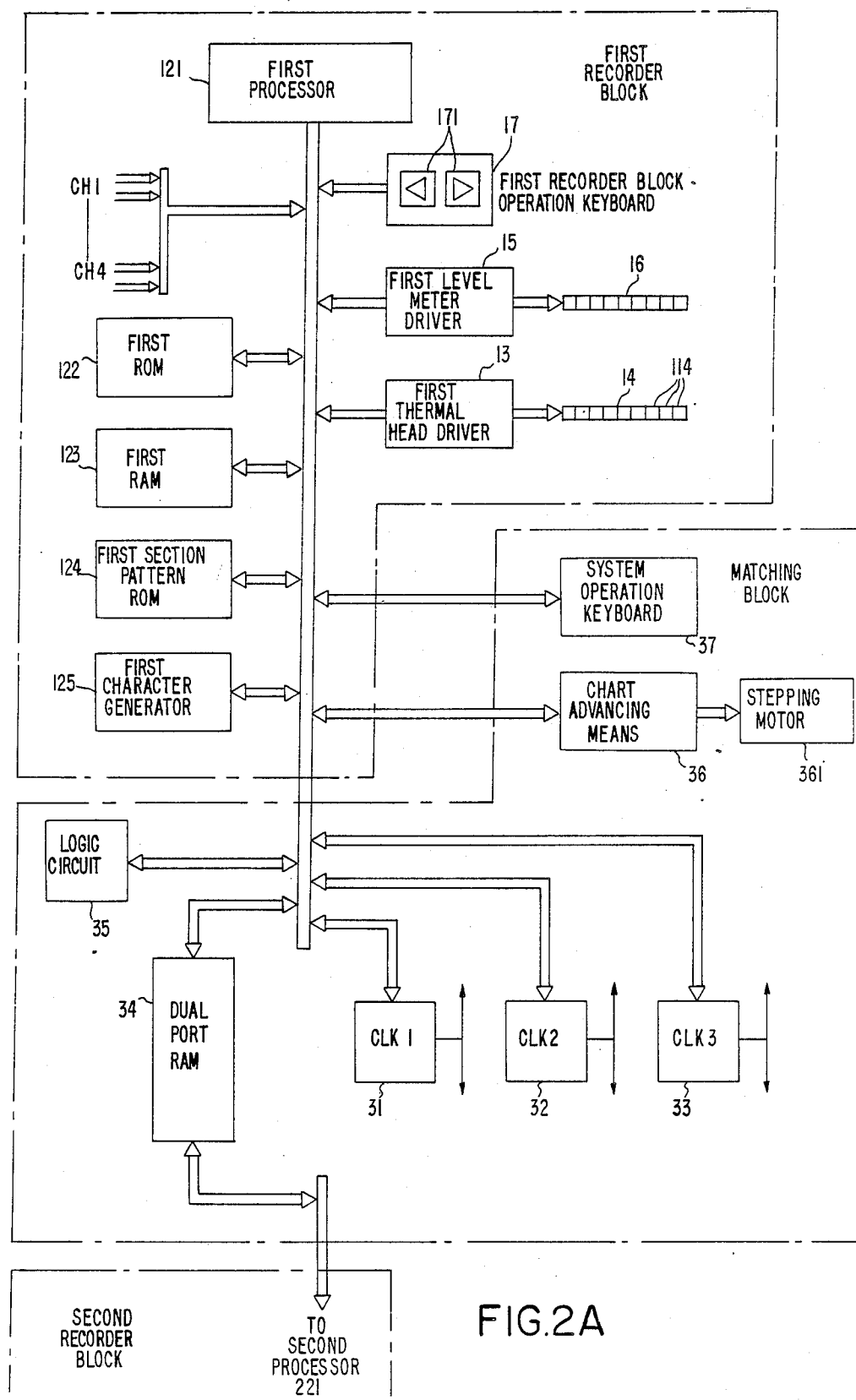
FIG. 2A is a detailed block diagram.
Figure 2B:
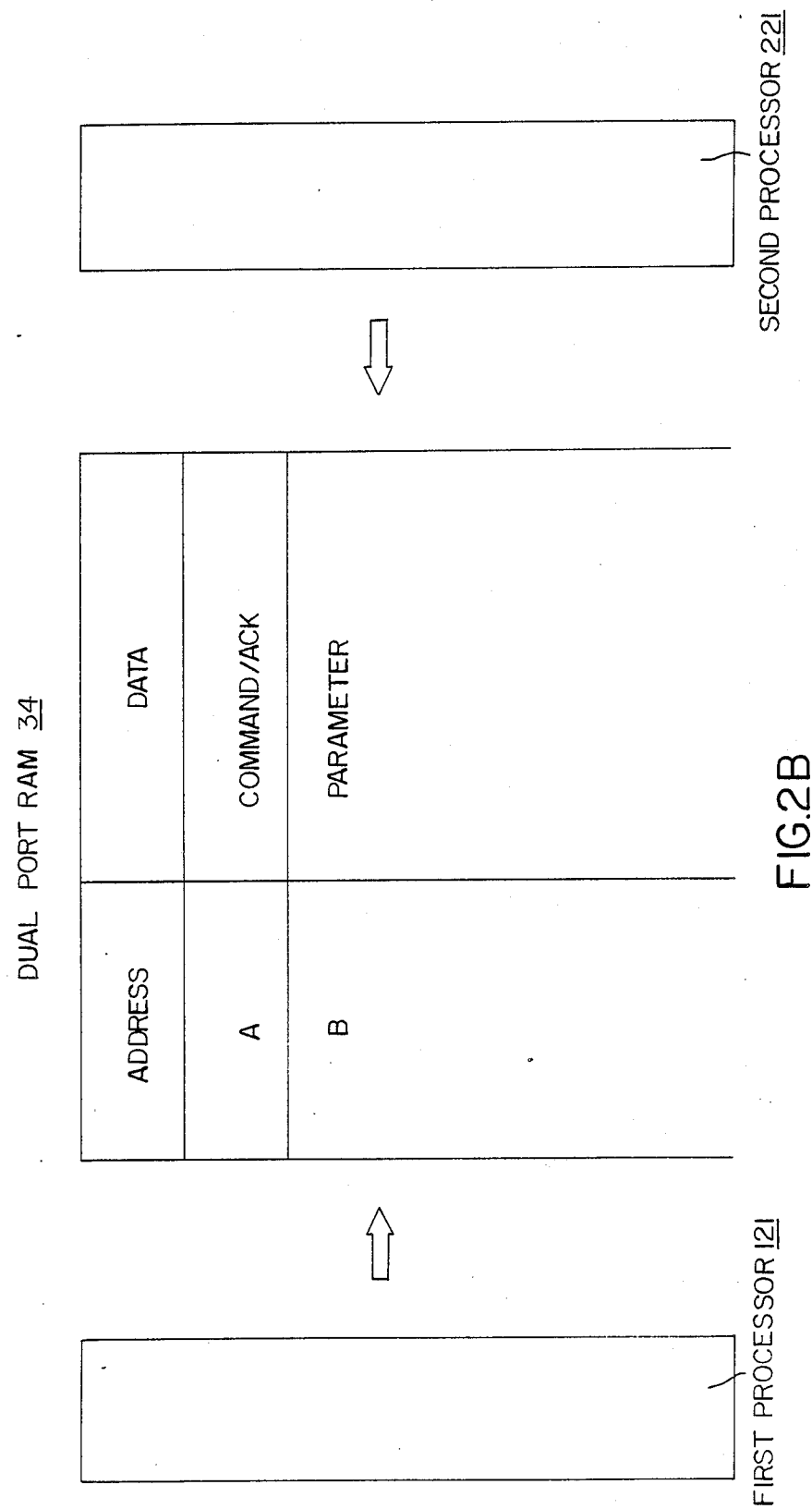
FIG. 2B is a diagram explanatory of the operation of a dual port RAM.

FIG. 2B is a diagram explanatory of the operation of the dual port RAM 34 of the matching block.

At the initial stage of use of the recorder, it is necessary for a user to set the state or conditions of the recorder. The setting in the embodiment is achieved by means of the system operation keyboard 37 shown in FIG. 2A. Here, assume that the user has just set the chart advancing speed and/or the mode of the memory unit. A command signal for execution of the setting is sent from the system operation keyboard 37 to the first record processing unit 12 at first. The first processor 121 decodes the command signal received, sets the first record processing unit 12 in the designated state, and writes the command signal in the dual port RAM 34.

The format of writing is such that as shown in FIG. 2B, for example, the foregoing command is written in address A of the dual port RAM 34 and its parameters in address B. Upon writing of the command in the dual port RAM 34, the second processor 221 of the second record processing unit 22 begins to operate, so that address A of the dual port RAM 34 is first read into the second record processing unit 22. Then, the parameters of address B are read into the second record processing unit 22.

To notify the first processor 121 that the command and parameters have been read in, the second processor 221 writes an ACK code in address A of the dual port RAM 34. The foregoing completes the transfer of one command and its parameters, and thereafter, other various commands and data are transferred in a similar manner. Then, the second processor 221 sets the second record processing unit 22 in the same designated state as for the first record processing unit 12.

Referring to FIG. 2A, all the three clock generators 31, 32 and 33 are put in operation in response to an instruction from the first processor 121 of the first record processing unit 12. The first clock generator 31 generates a time clock which is used to print time marks on the chart at given intervals of, for example, one second or ten seconds. The second clock generator 32 generates a process clock for the first and second memory units 11 and 21, which is used as a take-in clock for the analog signal to be recorded or as a memory control clock. This clock is used to control the memory units logic circuit 35 in response to the first processor of the first record processing unit 12. The third clock generator 33 generates a chart advance and print clock which is used to control the process of the first and second record processing units 12 and 22 and the advancing action of the chart advancing means 36.

The operation of the thus configured recorder of the present invention will now be described.

The user first sets the general conditions (chart speed, mode, etc ) of the recorder by means of the system operation keyboard 37.

In response to such setting the first processor 121 of the first record processing unit 12 sets the first record processing unit 12 in the designated state and writes the command signals in the dual port RAM 34 in such a manner as described above. The second processor 221 of the second record processing unit 22 reads out the command signals written in the dual port RAM 34 and sets the second record processing unit 22 in the designated state.

Here, assume that the recorder has just been set to the direct mode by means of the system operation keyboard 37. The first processor 121 sends a command to the second clock generator 32 to cause it to generate a predetermined clock CLK2. This clock CLK2 is applied to the memory unit logic circuit 35 under control of the first processor 121 to control its operation. The memory unit logic circuit 35 includes no processor, thus is made in the form of a hardware logic circuit. In response to the foregoing clock the memory unit logic circuit 35 controls taking of the analog signals into the individual channel blocks CH.1–CH.8 and writing thereof into the memories.

Each channel block receives the analog signal (Analog In.1–Analog In.8) which is converted by the successive approximation A/D converter 111 into digital values. These digital values thus produced are successively applied through the serial/parallel converter 112 to the digital comparator 114 where a maximum value and a minimum value appearing in a given interval are selected, these maximum and minimum values selected in relation to each given interval being successively stored in the min./max. memory 115.

The foregoing series of processes will now be described in greater detail with taking the channel block CH.1 as an example.

FIG. 3 is an explanatory diagram showing the timing of the foregoing processes. Specifically, FIG. 3(a) illustrates the input analog signal, Analog In.1, of CH.1; FIG. 3(b) a sampling clock generated at a period shorter than that of the clock CLK2 of the second clock generator 32 in response thereto; FIG. 3(c) the output of the successive approximation A/D converter 111; FIG. 3(d) the clock CLK2 of the second clock generator 32; FIG. 3(e) the data or the maximum value and the minimum value appearing in each interval defined by the clock CLK 2; and FIG. 3(f) the data stored in the min.-/max. memory 115 of the first memory block 113.

The signal to be measured, Analog In.1, shown in FIG. 3(a) is applied to the successive approximation A/D converter 111 where it is converted into the digital values [FIG. 3(c)] on the basis of the sampling clock (of period T1) shown in FIG. 3(b). These digital values are successively compared with one another in the digital comparator 114 so that the maximum value and the minimum value are selected. These maximum and minimum values thus selected with respect to each interval defined by the clock CLK2 (of period T2; T2=n T1) are stored in the min./max. 115.

Then, the data thus stored in the first memory blocks 113 of the channel blocks CH.1–CH.8 are sent to the first record processing unit 12 in the case of CH.1–CH.4, or to the second record processing unit 22 in the case of CH.5–CH.8.

The first record processing unit 12 and the second record processing unit 22 perform a given series of processes on the basis of the clock CLK3 of the third clock generator 33 and send the data to be recorded to the head drivers 13 and 23, respectively, whereby desired recording is achieved by the thermal heads 14 and 24. The manner of processing for record will now be described in greater detail.

The data or the maximum values and the minimum values held in the min./max. memories 115 are successively read out in relation to each interval defined by the clock CLK2 and sent to the corresponding record processing unit 12 or 22.

The period of the clock CLK3 of the third clock generator 33 which determines the print and chart advancing speed has a certain relation to the chart advancing speed set by means of the system operation keyboard 37.

Here, let T2 be the period of the clock CLK2 which determines the interval for selection of the maximum and minimum values being stored in the min./max. memory 115 and T3 be the period of the clock CLK3 of the third clock generator 33.

Where the period T3 accords with the period T2, i.e. where the clock CLK2 is identical with the clock CLK3, the maximum and minimum values of each interval of FIG. 3(d) are successively recorded per advancing motion of the chart.

Where the period T3 is two times longer than the period T2, i.e. where the clock CLK3 has an inter-pulse spacing two times longer than that of the CLK2, the maximum and minimum values of two intervals are recorded for each advancing motion of the chart. In practice, however, in order to protect the thermal head, a maximum value and a minimum value are derived from the maximum and minimum data of two intervals and used as the recording data.

Incidentally, in the embodiment, the relationship between the periods of the clocks CLK3 and CLK2 is set to T3=m T2 (m=1, 2, 3, ... ). Actual recording or printing with the heating element groups of the thermal heads 14 and 24 is performed by turning on all heating elements located between the maximum value and the minimum value in relation to each interval, as shown in FIG. 3(f). Accordingly, controlled by the clock CLK3 of the third clock generator 33 are the first record processing unit 12, second record processing unit 22, first head driver 13, second head driver 23, and chart advancing means 36 for advancing the chart. Of course, the level meter 16 is controlled by the level meter driver 15 so that it indicates the data in synchronism with the clock CLK3.

The recording operation of the memory mode will now be described. In the memory mode, the second memory block 116 shown in FIG. 1 is put in operation, instead of the first memory block 113. In this case, the recorder performs two stages of operation: a data take-in stage (1) and a data recording stage (2). The operation of the data take-in stage will now be described.

At the beginning of operation of the memory mode, the user determines the sampling period. This is required because the storage capacity of the RAM 117 of the second memory block 116 is limited. For example, where the RAM 117 has a storage capacity of 8 K bytes, it can store a phenomenon of one-second duration if sampling is performed at a sampling period of 8 KHz.

Therefore, the user is required to directly set the sampling period or to previously set how long duration the phenomenon is to be stored. This setting is achieved by means of the system operation keyboard 37 of the recorder.

In accordance with the foregoing setting, the first processor 121 sends an instruction to the second clock generator 32, so that the second clock generator generates the sampling clock having a given period from the clock CLK2 and supplies it to the memory unit logic circuit 35. The memory unit logic circuit 35 successively samples each input analog signal on the basis of the sampling clock, and controls the channel blocks CH.1–CH.8 so that each second memory block 116 stores and holds the thus produced digital data only for a given interval of time. In the channel block CH.1, for example, the output of the successive approximation A/D converter 111 is sent through the serial/parallel converter 112 and stored in the RAM 117 of the second memory block 116 successively. In this way, the data can be stored in the second memory blocks of all channel blocks CH.1–CH.8. Hence, the data take-in stage is completed.

Then, the data recording stage (2) is started.

In the data recording stage, the first processor 121 sends an instruction to the third clock generator 33. The third clock generator 33, whose clock CLK3 complies with the foregoing instruction, generates a certain clock to control the print period and the chart advancing speed. Further, the clock CLK3 of the third clock generator 33 acts on the RAM 117 of the second memory block 116 of each channel block under control of the corresponding processor 121 or 221 to cause the data stored in the RAM's to be successively sent to the corresponding record processing unit 12 or 22. Since the individual record processing units 12 and 22 and the chart advancing means 36 are supplied with the clock CLK3 of the third clock generator 33, due to their record processing and paper advancing functions, each analog recording signal is resultantly pictured or printed with the axis of time expanded by the ratio of the period of the clock CLK3 of the third clock generator 33 to the period of the sampling clock.

Accordingly, there can be obtained a finely recorded waveform through the recording operation of the memory mode.

Now, referring to FIG. 2C, the head driver of the present invention will be described. Since the head driver 13 of the first recorder block is identical in structure with the head driver 23 of the second recorder block, only the first head driver 13 will be described here.

The first head driver 13 has a first OR circuit 131, a first dual port RAM 132, a first serial/parallel converter 133, a first shift register 134, n density control circuits C1–Cn corresponding to the n heating elements of the first thermal head 14 which receives the output of the first head driver 13, and a first exciting circuit 135.

The first OR circuit 131 is adapted to combine the recording data processed and temporarily stored in the RAM 123 of the first record processing unit 12, the section pattern output data in the section pattern ROM 124 of the first record processing unit 12, and the character data of the character generator 125, that is, this first OR circuit 131 generates data which represent "print-on" when at least one data among the foregoing three data relating to the same location on the chart is present or "print-off" when no data is present. The combined recording data thus generated by the first OR circuit 131 are successively applied to the first dual port RAM 132. Then, the recording data in the first dual port RAM 132 are sent through the first serial/parallel converter 133 to the first shift register 134. The data in the first shift register 134 are delivered to the density control circuits C1–Cn provided correspondingly one-to-one to the individual heating elements of the first thermal head 14 where they are subjected to density control in a given manner; then, they are sent to the first exciting circuit 135. As a result, the heating element group of the first thermal head is excited.

The density control circuits playing an important role in the present invention will now be described in greater detail. Since each density control circuit is provided in relation to each heating element of the thermal head and is identical in structure with the others, only the first element density control circuit C1 related to the first heating element will now be described.

The first element density control circuit C1 is composed of a selector C1S, a memory C1M having first memory area M1, second memory area M2 and third memory area M3, a junction C1J connected to the output end of the memory C1M for providing three branches, two NOT circuits C11 and C12, and two AND circuits C13 and C14. The selector C1S distributes the data from the preceding shift register 134 to the three memory areas M1, M2 and M3 of the memory C1M. The selector C1S is controlled by the first processor 121, and its manner of distribution is such that the data of moment $t-2$ is sent to the first memory area M1, the data of moment $t-1$ to the second memory area M2, the data of moment t0 to the third memory area M3, the data of moment $T1 (=t0+1)$ to the first memory area M1, the, data of moment t2 to the second memory area M2, the data of moment t3 to the third memory area M3, and so on.

Although the junction C1J having three branches and the two NOT circuits C11 and C12 are exemplarily shown in FIG. 2C as being connected to the memory areas M1, M2 and M3 in that order, the order of connection can be appropriately changed selectively under control of the first processor, such as mentioned below with respect to density control at the time of moment $t+1$.

At a given point of time, the first memory area M1 holds the recording data of present moment t, the second memory area M2 holds the recording data of one-clock-old moment $t-1$, and the third memory area M3 holds the recording data of two-clock-old moment $t-2$, and that the junction C1J and the NOT circuits C11 and C12 are connected as illustrated. Accordingly, the recording data of moment t held in the first memory area M1 is applied to the junction C1J, the recording data of moment $t-1$ held in the second memory area M2 is applied to the NOT circuit C11, and the recording data of moment $t-2$ held in the third memory area M3 is applied to the NOT circuit C12.

The recording data or present moment t held in the first memory area M1 is branched into three by the junction C1J. The recording data on a first branch designated by A is sent to the first exciting circuit 135 to generate a dot recording pulse Pt (see FIG. 4). The recording data on a second branch designated by B, together with the NOT output of the NOT circuit C11 receiving the recording data of one-clock-old moment t−1 from the second memory area M2, is applied to the AND circuit C13. The output of this AND circuit C13 is sent to the first exciting circuit 135 to generate a dot recording pulse Pt−1. The recording data on a third branch designated by C, together with the NOT output of the NOT circuit C12 receiving the recording data of two-clock-old moment t−2 from the third memory area M3, is applied to the AND circuit C14. The output of the AND circuit C14 is sent to the first exciting circuit 135 to generate a dot recording pulse Pt−2 (see FIG. 4).

When the recording data at the junction C1J, i.e. the recording data of present moment t, is "print-off" (e.g. a binary zero), none of the dot recording pulses are generated. When all of the recording data of moment t, moment t−1 and moment t−2 are "print-on" (e.g. a binary one), the record exciting duration of present moment t corresponds to the exciting duration defined by the dot recording pulse Pt, as seen at (a) in FIG. 4. When moment t and moment t−1 indicate "print-on" and moment t−2 indicates "print-off" of the recording data, the record exciting duration of present moment t is the sum of the exciting durations defined by the dot recording pulse Pt and the dot recording pulse Pt−2; when moment t and moment t−2 indicate "print-on" and moment t−1 indicates "print-off" of the recording data, the record exciting duration of present moment t is the sum of the exciting durations defined by the dot recording pulse Pt and the dot recording pulse Pt−1; and when only moment t indicates "print-on" of the recording data, the record exciting duration of present moment t is the sum of the exciting durations defined by the dot recording pulse Pt, the dot recording pulse Pt−1 and the dot recording pulse Pt−2, as seen at (d) in FIG. 4.

In the foregoing, the dot recording pulse Pt generated on the basis of the recording data of present moment, the dot recording pulse Pt−1 generated on the basis of the recording data of one-clock-old moment, and the dot recording pulse Pt−2 generated on the basis of the recording data of two-clock-old moment may be appropriately subjected to weighting while taking individual heat radiation into consideration.

As described above, the recorder according to the present invention is featured in that the exciting duration of each heating element of the thermal heads 14 and 24 is controlled on the basis of the history up to two-clock-old moment of the recording data; therefore, uniform control of density can be achieved.

After the recording of present moment t is performed in the foregoing manner, the recording of next moment t+1 will be performed.

In this step, a recording data of moment t+1 is newly written in the third memory area M3; but the recording data of moment t and moment t−1, i.e. of the two preceding moments, are still held in the first memory area M1 and the second memory area M2, respectively. In this case, the connection of the three memory areas M1, M2 and M3 with the junction C1J and the NOT circuits C11 and C12 may be changed by the microprocessor as follows. The recording data of moment t+1 held in the third memory area M3 is connected with the junction C1J, the recording data of moment t held in the first memory area M1 is connected with the NOT circuit C11, and the recording data of moment t−1 held in the second memory area M2 is connected with the NOT circuit C12. That is, the connection of the memory areas M1, M2 and M3 with the junction C1J and the NOT circuits C11 and C12 is circulatingly or sequentially changed each time the moment of recording is renewed. While this is not specifically illustrated in FIG. 2C, the end effect is clear therefrom when the appropriate values are considered inserted in the memory areas by operation of the distributor or selector C1S, etc.

It may now be realized that the subject invention resides in a method of providing a data record with a thermal recording head 14, including a plurality of clocked heating elements 114, in which the records are controlled in density by continually storing for each of said heating elements a present moment recording datum (t, FIG. 4) and further recording data including a one-clock-interval-old recording datum (t−1), and a two-clock-interval-old recording datum (t−2) for the particular heating element 114, and by continually generating for each heating element from the present moment recording datum (t) to be recorded a first dot recording energization quantum Pt and for each of said further dot recording data having been printed (t−1, t−2) a dot recording energization pause 400, 401 or 402 and for each blank value of said further dot recording data a further dot recording energization quantum Pt−1 or Pt−2, and by sequentially energizing the heating elements 114 with dot recording quanta Pt, Pt−1, Pt−2 thus generated.

Figure 2C:
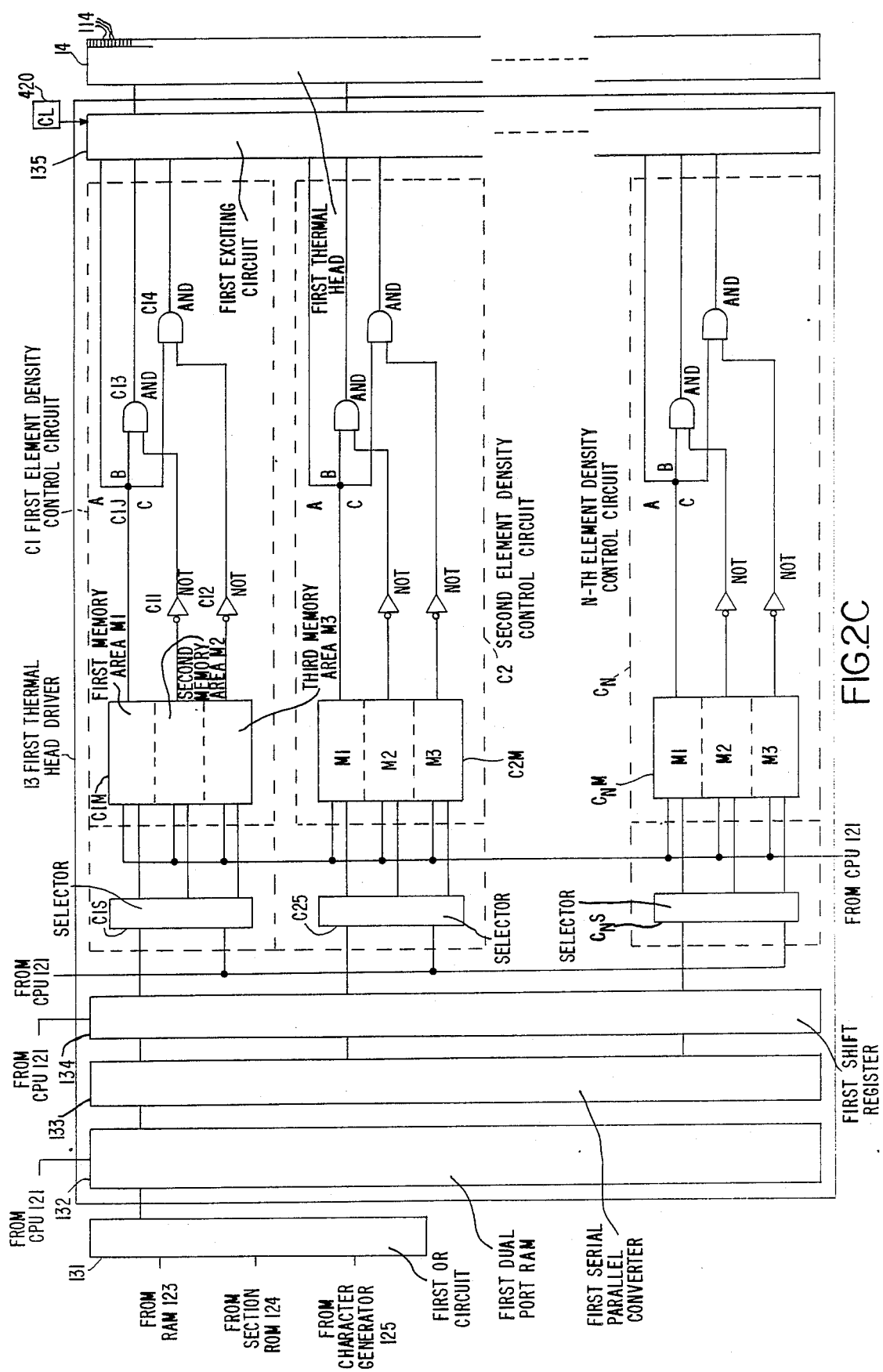
FIG. 2C is a detailed explanatory diagram of a head driver.
Figures 4A, 4B, 4C, 4D:
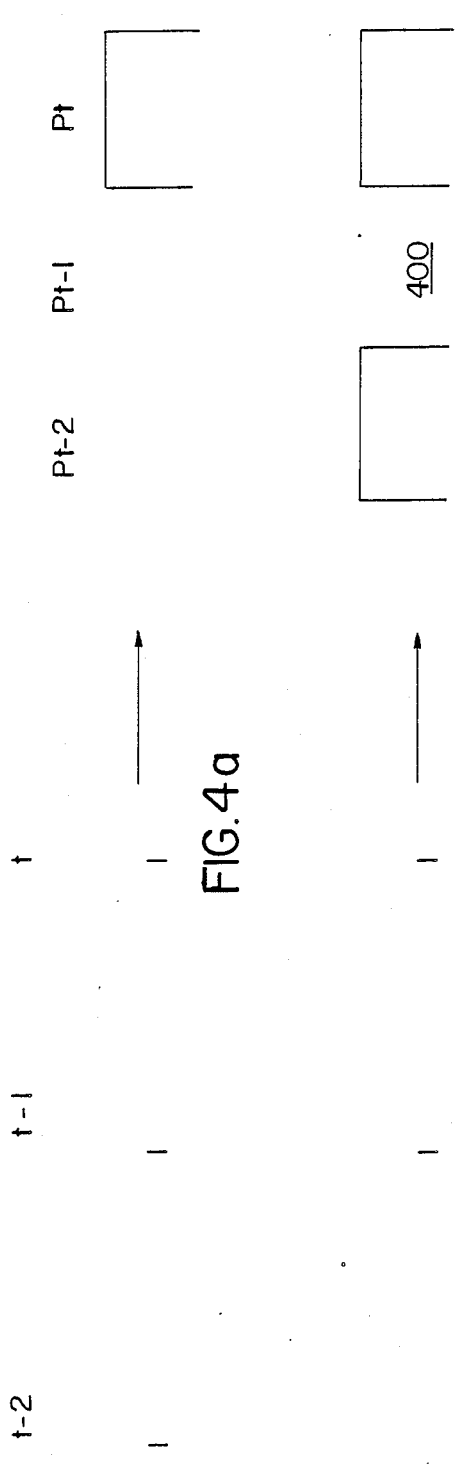
FIGS. 4a to 4d are a timing diagram showing how previously printed dot energizations provide energization pauses in subsequent heating element energizations according to a preferred embodiment of the invention.

Particularly with respect to FIGS. 2C, 4 and 5(c), it will be noted that the illustrated preferred embodiment of the invention in effect inserts for each one-clock-interval-old recording datum (t−1) having been printed by the particular heating element 114 an energization pause 400, FIG. 4(b) and FIG. 5(c) between a dot recording energization quantum Pt−2 corresponding to a blank value 404, FIG. 5(b) of the immediately preceding two-clock-interval-old recording datum (t−2) and the then present moment dot recording energization datum Pt.

FIG. 5 may be helpful for an understanding of this principle.

In particular, FIG. 5(a) shows clock pulses 410, 411, 412, et seq., indicating chart feed increments, such as provided by the clock 33. Dots 405, 406, 407 and 409 are dots printed out on the chart 417 by a particular heating element 114 or printout element of the thermal or other recording head. This has been referred to above as "print-on." This could, for example, represent a binary one.

On the other hand, the empty dots 403, 404 and 408 in effect indicate blank values of energization quanta, referred to above as "print-off." This could, for instance represent a binary zero, since no dot is printed by that heating element at the clock times 410, 411 and 415. As indicated by the flat branch 418 of the energization waveform shown in FIG. 5(c), no energization is then supplied to the particular heating element, even if the preceding dot was also blank, as at 403 with respect to 404. Apart from this, however, preceding blank values 403, 404, 408, provide a dot recording energization quantum Pt−1 and/or Pt−2, for each present moment energization quantum Pt being printed, such as at 405, 406, 407 and 409 in FIG. 5.

In particular, as seen in FIG. 5(c), and also in FIG. 4(d), the preceding two blank values 403 and 404, or the density control circuit shown in FIG. 2C, produce dot recording quanta Pt−2 and Pt−1, inasmuch as 403 is at the two-clock-interval-old moment t−2 (410) and 404 at the one-clock-interval-old moment t−1 (411) with respect to the present moment 412 at which the dot 405 is printed. In this manner, the the particular heating element heats up sufficiently for high-speed printing, even if it was not energized for two or more clock intervals before that moment.

On the other hand, if the present moment is at 413 in FIG. 5, then only the blank value 404 of the then two-clock-interval-old blank value 404 produces an energization quantum or pulse Pt−2 for the dot 406, while the printed one-clock-interval-old value or datum 405, or the density control circuit shown in FIG. 2C, inserts a pause 400 between that energization quantum Pt−2 and the then present moment recording quantum or pulse Pt, all as shown below clock pulse 413 in FIG. 5 and also in FIG. 4(b). In this manner, the heating element still cannot overheat.

Also, as shown at 414 in FIG. 5, the heating element of the thermal recorder still cannot overheat, even if a dot 407 is to be recorded after two immediately preceding energizations at 405 and 406. In that case these preceding energization quanta, or the density control of FIG. 2C, in effect produce a pause 401 in energization lasting two clock pulses 421, so that only the present moment energization quatum Pt is applied to the heating element for producing the dot 407 on the chart 417.

As shown by the flat portion 419 in FIG. 5(c), no energy is applied to the particular heating element, when no datum is to be printed out, as indicated by the blank circle 408.

On the other hand, such blank value or datum 408 produces a dot energization datum Pt−1 when the present moment has arrived at clock pulse 416, where the present moment quantum Pt indicates that the dot 409 is to be printed.

In terms of operation of the density control circuit of FIG. 2C, it may be said that the printed value of the dot 407 then at the two-clock-interval-old moment 414 produces a blank value 402 ahead of the energizing quanta or pulses Pt−1 and Pt at 416 in FIG. 5.

According to the current best mode for carrying out the invention, the energization quanta or pulses Pt, Pt−1, and Pt−2 as generated are preserved at least to some extent in their application to the particular heating element 114 so that there is a difference in energization between moment 413, when the pause 400 is between two succeeding energization quanta or pulses Pt−2 and Pt, and between the moment 416 when the pause 402 is ahead of the quanta Pt−1 and Pt, or when there is no significant pause between such energization quanta or pulses Pt−1 and Pt.

This differentiation may be effected by various means, but FIGS. 2C and 5(d) show a clock 420 providing the exciting circuit 135 for the heating elements 114 of the thermal recording head 14 with clock pulses 421 corresponding in occurrence to the energization quanta or pulses Pt, Pt−1, Pt−2. By way of example, the exciting circuit 135 may for this purpose include components of the type of selectors C1S, C25, for the purpose of applying the energization quanta or pulse Pt−2, Pt−1, and Pt sequentially to the particular heating element.

In this or any other manner pursuant to the preferred embodiment of the invention, the intervening pause 400 assures a slight cooling period after the energization quantum Pt−2 for the dot 406 energized by the present moment quantum Pt at 413.

The preferred embodiment of the invention thus provides a better density control by differentiating between the case when there was one printed-out dot 405 immediately ahead of the present moment dot 406, and the case when there was an intervening blank 408 between the later present moment printed dot 409 and the preceding printed dot 407.

This is a significant improvement over the proposal of the above mentioned Mori U.S. Pat. No. 4,748,455 where FIG. 14 shows that the spacing between succeeding energization pulses 22, 23 remains relatively wide, as in the prior art (FIG. 10), designed for the worst-case moment of three succeeding dots or values "1".

The subject invention, on the other hand, permits a closer spacing and more rapid printing, since it differentiates between the case when there is an immediately preceding printed dot 405 (as to present moment dot 406), and the case when there is one intervening blank 408 between succeeding printed dots 407 and 409, in addition to differentiating with respect to the case when there are two blanks 403 and 404 preceding the printed dot 405, and two preceding printed dots 405 and 406 preceding another present moment printed dot 407.

At the same time, the subject invention avoids the complex heat accummulation compensation or calculation circuitry of the above mentioned Inui et al U.S. Pat. No. 4,574,293 and Moriguchi et al U.S. Pat. No. 4,607,262.

In particular, the preferred embodiment of the invention illustrated in FIG. 2C provides memory areas for distinctly storing recording data, including three memory areas M1, M2, M3 for each heating element 14, a selector C1S for sequentially applying to each of these three memory areas a present moment recording datum, t, a one-clock-interval-old recording datum, t−1, and a two-clock-interval-old recording datum, t−2, respectively, for the particular heating element, a first inverter C11 having an input connected to the memory area M2 storing the one-clock-interval-old recording datum, a second inverter C12 having an input connected to the memory area M3 storing the two-clock-interval-old recording datum, a first AND element C13 having a first input connected to the memory area M1 storing the present moment recording datum and its second input connected to an output of the first inverter C11, a second AND element C14 having a first input also connected to the memory area M1 storing the present moment recording datum and its second input connected to an output of the second inverter C12. The first exciting circuit 135 is connected to the memory area M1 storing the present moment recording datum and to outputs of the first and second AND elements C13 and C14 for sequentially energizing the particular heating element 114 pursuant to the present moment recording datum (Pt) and with an output of the first AND element (Pt−1) and an output of the second AND element (Pt−2).

Within the scope of the invention, that concept may be broadened to have the AND elements C13, C14, etc. correspond in number for each heating element to the number of the memory areas M1, M2, etc. for each heating element minus one. Such AND elements have outputs connected to the energizing or exciting circuit 135, and there is an inverter C11, C12, etc. for each AND element and has an output connected to an input of that AND element. As described above a processor 121 selectively or sequentially connects one of the memory areas M1 to the energizing or exciting circuits 135 and inputs of the inverters C11, C12, etc. to other of the memory areas M2, M3, etc.

Even such an expansion within the scope of the invention is still much simpler in circuitry than the above mentioned prior-art heat calculation apparatus.

The subject extensive disclosure will render apparent or suggest to those skilled in the art various modifications and variations within the spirit and scope of the subject invention and equivalents thereof.

I claim:

1. In apparatus for recording data with a thermal recording head including a plurality of clocked heating elements,
   the improvement comprising in combination:
   means including memory areas for continually storing for each of said heating elements a present moment recording datum and further recording data including a one-clock-interval-old recording datum and a two-clock-interval-old recording datum for the particular heating element;
   means connected to said memory areas for continually generating for each heating element from the present moment recording datum to be recorded a first dot recording energization quantum and for each of said further dot recording data having been printed a dot recording energization pause and for each blank value of said further dot recording data a further dot recording energization quantum; and
   means connected to said generating means for sequentially energizing said heating elements with the dot recording quanta thus generated;
   said generating means including:
   AND elements corresponding in number for each heating element to the number of said memory areas for each heating element minus one, and having outputs connected to said energizing means;
   an inverter for each AND element having an output connected to an input of that AND element; and
   a processor for selectively connecting one of said memory areas to said energizing means and inputs of said inverters to other of said memory areas.

2. Apparatus as claimed in claim 1, wherein:
   said generating means include means for inserting for each one-clock-interval-old recording datum having been printed by the particular heating element an energization pause between a dot recording energization quantum corresponding to a blank value of the immediately preceding two-clock-interval-old recording datum and said first dot recording energization quantum.

3. In apparatus for recording data with a thermal recording head including a plurality of clocked heating elements,
   the improvement comprising in combination:
   means including memory areas for continually storing for each of said heating elements a present moment recording datum and further recording data including a one-clock-interval-old recording datum and a two-clock-interval-old recording datum for the particular heating element;
   means connected to said memory areas for continually generating for each heating element from the present moment recording datum to be recorded a first dot recording energization quantum and for each of said further dot recording data having been printed a dot recording energization pause and for each blank value of said further dot recording data a further dot recording energization quantum; and
   means connected to said generating means for sequentially energizing said heating elements with the dot recording quanta thus generated;
   wherein said generating means include:
   AND element corresponding in number for each heating element to the number of said memory areas for each heating element minus one, and having outputs connected to said energizing means;
   an inverter for each AND element having an output connected to an input of that AND element; and
   a processor for sequentially connecting said memory areas for said heating element to said energizing means and the remaining memory areas for said heating element sequentially to inputs of said inverters.

4. Apparatus as claimed in claim 3, wherein:
   said generating means include means for inserting for each one-clock-interval-old recording datum having been printed by the particular heating element an energization pause between a dot recording energization quantum corresponding to a blank value of the immediately preceding two-clock-interval-old recording datum and said first dot recording energization quantum.

5. In apparatus for recording data with a thermal recording head including a plurality of clocked heating elements,
   the improvement comprising in combination:
   memory areas for distinctly storing recording data, including three memory areas for each heating element;
   means for sequentially applying to each of said three memory areas a present moment recording datum, a one-clock-interval-old recording datum, and a two-clock-interval-old recording datum, respectively, for the particular heating element;
   a first inverter having an input connected to the memory area storing said one-clock-interval-old recording datum;
   a second inverter having an input connected to the memory area storing said two-clock-interval-old recording datum;
   a first AND element having a first input connected to the memory area storing said present moment recording datum and its second input connected to an output of said first inverter;
   a second AND element having a first input also connected to the memory area storing said present moment recording datum and its second input connected to an output of said second inverter; and
   means connected to the memory area storing said present moment recording datum and to outputs of said first and second AND elements for sequentially energizing the particular heating element pursuant to said present moment recording datum, and with an output of said first AND element and an output of said second AND element.

* * * * *